United States Patent [19]

Littau

[11] Patent Number: 4,538,406

[45] Date of Patent: Sep. 3, 1985

[54] MECHANICAL BERRY HARVESTER HAVING ROW-WIDTH-ADJUSTABLE BEATER

[75] Inventor: Eugene G. Littau, Aumsville, Oreg.

[73] Assignee: Littau Harvester, Inc., Stayton, Oreg.

[21] Appl. No.: 491,390

[22] Filed: May 4, 1983

[51] Int. Cl.³ .......................................... A01D 46/00
[52] U.S. Cl. .................... 56/330; 56/328 R
[58] Field of Search ................ 56/327 R, 328 R, 330

[56] References Cited

U.S. PATENT DOCUMENTS

| | | | |
|---|---|---|---|
| 3,203,159 | 8/1965 | Weygandt et al. | 56/330 |
| 3,613,343 | 10/1971 | Sagouspe et al. | 56/330 |
| 3,703,072 | 11/1972 | Patzlaff | 56/330 |
| 3,705,456 | 12/1972 | Chen et al. | 56/330 |
| 3,726,071 | 4/1973 | Mecca | 56/330 |
| 3,727,388 | 4/1973 | Smith | 56/330 |
| 3,890,775 | 6/1975 | Bruel | 56/330 |
| 3,961,469 | 6/1976 | McRobert | 56/328 R |
| 4,051,649 | 10/1977 | Clary | 56/330 |
| 4,085,572 | 4/1978 | Bruel | 56/330 |
| 4,112,657 | 9/1978 | Bénac et al. | 56/330 |
| 4,173,859 | 11/1979 | Goldsmith et al. | 56/330 |
| 4,236,371 | 12/1980 | Claxton | 56/330 |

FOREIGN PATENT DOCUMENTS 2410951  8/1979  France .................................. 56/330

Primary Examiner—Gene Mancene
Assistant Examiner—David L. Tarnoff
Attorney, Agent, or Firm—Kolisch, Hartwell & Dickinson

[57] ABSTRACT

Cane-berry harvesting apparatus transportable relative to a generally vertically disposed row of vines. Beaters are pivotally mounted on a harvester frame for swinging in arcs toward and away from a vine-receiving zone disposed within the frame. A reciprocating driver, mounted for selectable position adjustment on the frame, is connected to the beater for reciprocatively swinging the latter in a known arc in the zone. Means are included for selectively adjusting the position of the drive means relative to the frame in a manner varying the position of the beater arc within the zone. Opposing sets of beaters may be disposed in the vine-receiving zone for reciprocating in arcs which are disposed in mirror-image relationship relative to the vertical plane of the vine-receiving zone. These beaters are adjustable by adjusting the driver relative to the frame for adjusting the distance between the corresponding opposing arcs.

2 Claims, 6 Drawing Figures

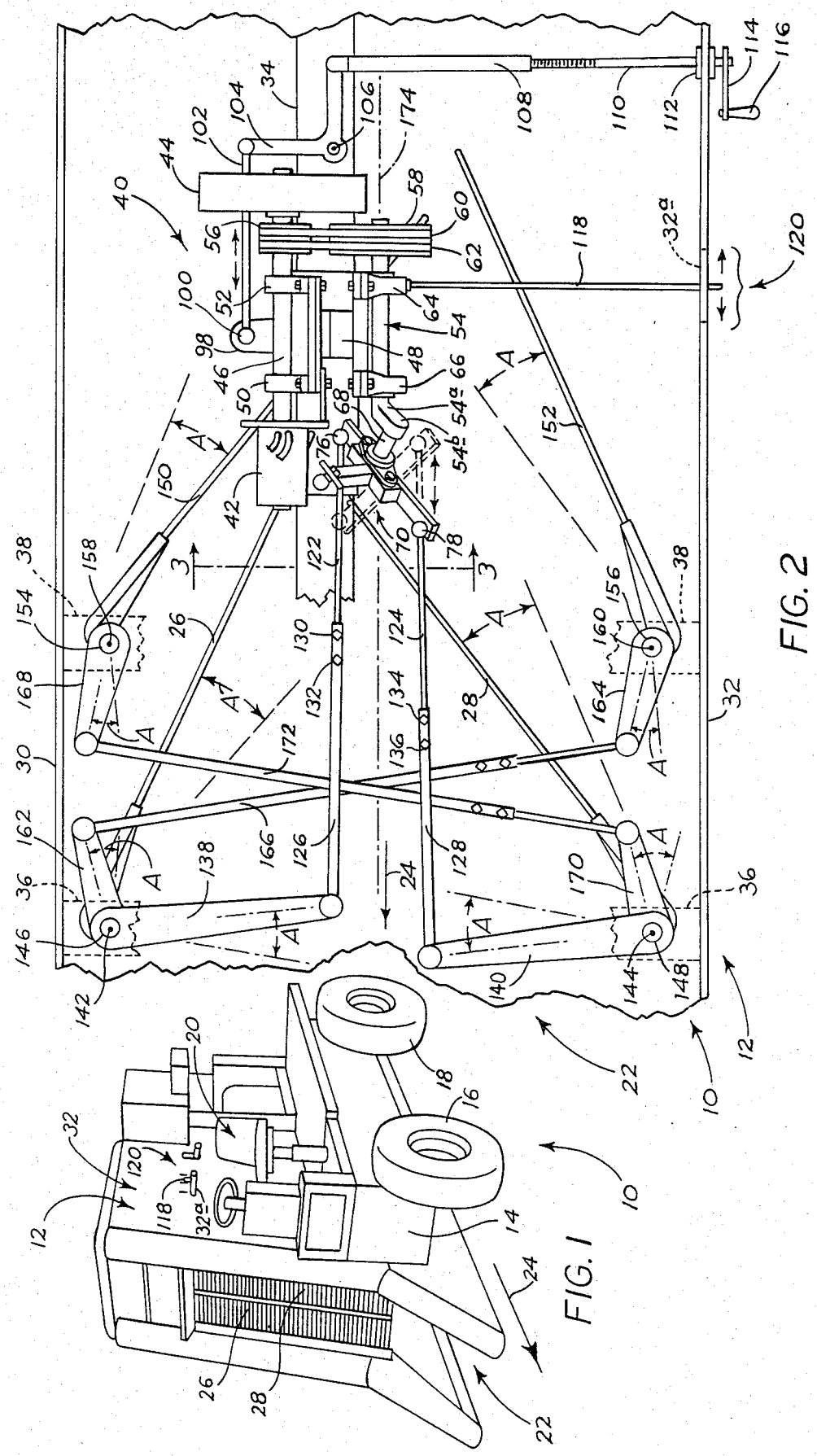

MECHANICAL BERRY HARVESTER HAVING ROW-WIDTH-ADJUSTABLE BEATER

BACKGROUND AND SUMMARY OF THE INVENTION

This invention pertains to a vertical-row-type cane-berry harvester, and in particular, to such a harvester having beaters which are adjustable and in position relative to such a row.

Mechanical harvesters have been used for a number of years for harvesting cane-berry-type row crops and other similar types of crops, such as raspberries, blackberries and grapes, which may be trained into rows and trellised for harvesting. Mechanical harvesting reduces the high labor cost typically involved in such harvesting and also increases the rate of harvesting.

Rows of such crops within any given field tend to vary in the vitality of growth of the vines as well as their conformance with the trellising to which they are trained. As a result, there is typically significant variation in the thickness of the rows. Conventionally, mechanical harvesters have beaters disposed for placement on each side of a row with such beaters traveling within known arcs relative to the row. Depending on the particular crop being harvested, the beaters are set to contact the vines a predetermined amount, depending on the type of fruit and expected width of the vines. In one conventional harvester, a drive motor moves connecting rods in a reciprocating motion for movement of a lever arm attached to the beaters for driving the latter in the previously mentioned arcs. A difference in separation between opposing beaters on opposite sides of a row are provided by adjusting the lengths of the connecting rods. This adjustment is typically made by varying the position of such a rod in an adjoining sleeve.

This type of harvester cannot be operating while adjusting the distance between beater arcs. Since there may be numerous variations in the width of a row in any given field, as has been mentioned, it is unusual for a former to take the time to make the row-width-accommodating adjustment required in order to provide most effective harvesting for the different widths of rows. He therefore accepts reduced harvest quantities in favor of expediting the harvesting process by not taking time to make the otherwise appropriate adjustments.

It is therefore a general object of the present invention to overcome the noted deficiencies in the known prior art.

In particular, it is an object to provide such a harvester which can easily be adjusted for accommodating rows of different widths.

It is a further objective to provide such a harvester which is dynamically adjustable, that is, one which is adjustable while the harvester is in the process of harvesting.

In the preferred emodiment of the present invention, a harvester is provided having a frame and a driver motor mounted for selectable position adjustment on the frame. This motor is drivingly connected to beaters disposed adjacent what may be termed a vine-receiving zone. A crank driving a rod in a screw coupling is attached to the frame and the motor for selectively adjusting the position of the motor relative to the frame. This correspondingly adjusts the position of the beater arcs within the vine-receiving zone. A position rod attached to the motor mount is disposed adjacent a linear scale positioned on the frame for visually indicating the relative position of the motor to the frame, and thereby, the distance between opposing beater arcs within the vine-receiving zone.

It can be seen that by manipulation of the crank the motor may be shifted in position on the frame during harvesting. Thus, as a farmer is harvesting a row, he can, as a result of observing a variation in the thickness of the particular row which he is harvesting, shift the position of the motor relative to the frame, and thereby shift the distance between the beater arcs to compensate for the changed row width. With such an apparatus, a farmer can apply a preferred beater action to each row as it is being harvested, thereby maximizing his harvest without reducing the rate of travel along a row.

These and additional objects and advantages of the present invention will be more clearly understood from a consideration of the drawings and the following detailed description of the preferred embodiment.

BRIEF DESCRIPTION OF THE DRAWINGS

FIG. 1 is a perspective view of a mechanical harvester made in conformance with the present invention.

FIG. 2 is an enlarged fragmentary simplified top view of a portion of the harvester of FIG. 1 illustrating the pertinent features of the present invention.

DETAILED DESCRIPTION OF THE INVENTION

Figures 3, 4:
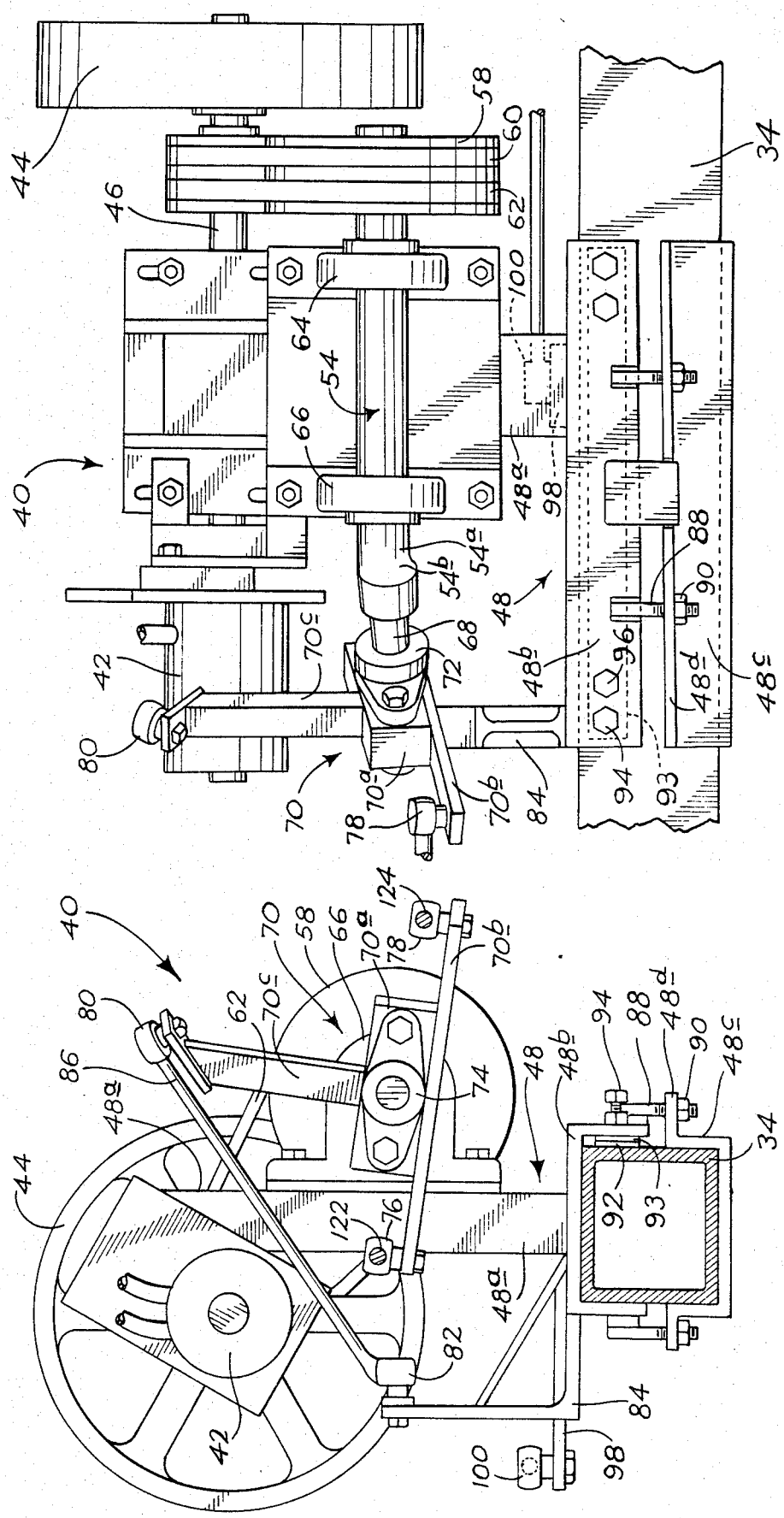
FIG. 3 is an enlarged view of a portion of FIG. 2 taken along line 3—3 therein.
FIG. 4 is a view of the apparatus of FIG. 3 taken from the right side of that figure.

Referring initially to FIG. 1, shown generally at 10 is a mechanical harvester made in conformance with the present invention. Harvester 10 includes a frame, shown generally at 12, and an engine compartment 14 housing an engine and appropriate transmission for driving ground-contacting wheels, such as wheels 16, 18, shown. Harvester 10 is controlled from an operating station shown generally at 20. The harvester frame is constructed to receive berry or other fruit crop vines growing in a row in what is referred to herein as a vine-receiving zone shown generally at 22. Attached to frame 12 and disposed within zone 22 are a plurality of beaters. There are typically a plurality of sets of beaters which are disposed for pivoting within arcs relative to the longitudinal center of zone 22. Using the direction of travel for harvester 10 as that shown by arrow 24, the beaters shown in FIG. 1 include a right front set of beaters 26 and an opposing left front set of beaters 28. Beaters 26, 28 are also referred to herein as beater means.

Describing now in more detail the portions of harvester 10 particularly pertinent to the present invention, reference is made to FIG. 2 and in part to FIGS. 3 and 4. Frame 12 includes right and left panels 30, 32, respectively, and a central support beam 34 which is shown in fragmentary form. The frame also includes what I will refer to as beater support cross members 36, 38 which extend between the right and left panels 30, 32, as showon. Only the cross member ends are shown partially in fragmentary form in phantom lines for purposes of illustrating the invention more clearly. Slidably mounted for selectable position adjustment on beam 34 is a reciprocating driver, or drive means, 40 including a hydraulic motor 42 connected to a flywheel 44 via a shaft 46 supported on a motor carriage, or carriage means, 48 by bearings 50, 52, as shown.

The rotational motion of shaft 46 is transferred to a second shaft 54 via pulleys 56, 58, mounted on the respective shafts and joined by a pair of parallel pulley belts 60, 62. Shaft 54 is mounted on carriage 48 by appropriate bearings 64, 66.

The front end of shaft 54, as viewed in FIG. 2, has an elbow 54a forming a foot 54b to the end of which is fixedly attached an eccentric shaft 68 disposed at an angle relative to the main portion of shaft 54. The details of driver 40 are more clearly represented in enlarged FIGS. 3 and 4. Shaft 68 has an axis which intersects the axis of shaft 54. Disposed at the intersection of these axes is a rotation-to-reciprocation converter member, shown generally at 70. Member 70 is rotatably fixed to shaft 68 by a pair of bearings 72, 74 mounted on opposite sides of member 70, as shown. The member includes a base 70a having a box-like shape through which shaft 68 freely passes and to which bearing 72, 74 are mounted. Fastened to the bottom side of base 70a is what I will refer to as a diameter bar 70b which extends an equal distance on either side of shaft 68 along a line normal to the longitudinal axis of that shaft. Disposed at opposite ends of bar 70b are universal pivot joints 76, 78, which will also be referred to as right and left end pivot joints.

A member radius bar 70c extends normally to the longitudinal axis of shaft 68 and to diameter bar 70b. Bar 70c also terminates in a universal pivot joint 80.

Another pivot joint 82 is positioned with a center of pivoting disposed in a horizontal plane containing the longitudinal axis of shaft 54. Joint 82 is connected to carriage 48 by a reinforced L-shaped support member 84 in such a manner that joints 80, 82 are disposed approximately equal distances from the longitudinal axis of shaft 54 to form what may be conceptualized as two corners of an isosceles right triangle. A connecting rod 86 connects joints 80, 82, as shown, forming what may be thought of as the hypotenuse of the aforementioned triangle. Support 84, rod 86 and radius arm 70c in combination form an anti-rotation structure as will become more clear in the discussion on operation of harvester 10.

Carriage 48 includes a driver support mast 48a to which are mounted the aforementioned hydraulic motor, flywheel and pulleys with corresponding shafts. Mast 48a is connected to a downward facing C-shaped base 48b which is clamped along the side margins to a similarly shaped upward-C-facing channel 48c. Base 48b and channel 48c are in compressed slidable fit around frame beam 34 by bolts such as bolt 88 shown on the left front side portion of base 48b extending through an outward-directed flange, such as flange 48d. A nut 90 is screwed on the threads of bolt 88 against flange 48d for holding base 48b and channel 48c against beam 34.

A rigid rubber pad 92 is interposed the left vertical margin of base 48b and beam 34. An elongate metal plate 93 is sandwiched between pad 92 and the just-mentioned left vertical margin of base 48b. A pair of hexagonal headed bolts, such as bolts 94, 96 are screwed through corresponding threaded apertures in base 48b against plate 93 sufficiently to apply a desired force against pad 92. A lubricating grease is applied between base 48b, channel 48c and the corresponding surfaces of beam 34. Sufficient pressure is applied by bolts 94, 96 such that carriage 48 may be slid along beam 34 when sufficient longitudinal force is applied thereto but which will otherwise stay in a single position, even when operated.

Extending laterally from the right rear corner of the top of base 48b is an arm 98. At the end of arm 98 is another universal joint 100. Joint 100 is connected by a rod 102 which extends rearwardly to pivotal connection with the end of an L-shaped lever arm 104. The elbow of arm 104 is pivotally connected to the top of beam 34 at point 106, as shown in FIG. 2.

The other end of arm 104 extends toward the rear where it is pivotally connected to an adjustable-length connecting rod formed of an interiorly threaded sleeve 108 and a compatably threaded exteriorly threaded rod 110 which is at least partially screwed into sleeve 108. Sleeve 108 and rod 110, also referred to as screw means, extend laterally of beam 34, with rod 110 extending through panel 32 where it passes through a bearing 112 to a hand crank 114 with handle 116. The mechanical assembly of parts beginning with arm 98 and extending through to crank 114 are collectively referred to herein as means for selectively adjusting the position of drive means relative to the frame. It can be seen that by turning crank 114 in one direction causes sleeve 108 to be unscrewed relative to rod 110 thereby causing arm 104 to rotate in a counterclockwise direction as viewed in FIG. 2. This results in carriage 48, and therefore driver 40, being shifted forwardly on beam 34. A reverse cranking results in the reverse movement of driver 40.

Also attached to carriage 48 is a indicator rod 118 which is fixedly attached to the top of base 48b and extends laterally of beam 34 through a slit 32a in panel 32, as shown. Slit 32a extends generally horizontally and is long enough to accommodate forward and rearward movement of rod 118 to its extremes of movement as provided by turning of crank 114. For reference purposes a scale, shown generally at 120, on the outside of panel 32, as viewed in FIG. 1, indicates the position of driver 40 relative to beam 34. Rod 118, slit 32a and scale 120 are referred to jointly as position indicating means.

Redirecting attention again to FIG. 2, in particular, and addressing attention to the region around rotation-to-reciprocation converting member 70, extending forwardly from pivot joints 76, 78 are connecting rods 122, 124, respectively. Rods 122, 124 extend into sleeve portions 126, 128, respectively, where they are held rigidly in position relative thereto by bolts 130, 132 and 134, 136, respectively. The forward ends of sleeve portions 126, 128 terminate pivotally on the inner ends of inwardly directed lever arms 138, 140, respectively. Arms 138, 140 are pivotally connected to cross member 36, shown only fragmentarily in phantom lines as discussed previously, for pivoting about generally vertical axes shown at points 142, 144, respectively. Arms 138, 144 are rigidly mounted on axles 146, 148, respectively. The structure just described is also referred to as means connecting drive and beater means. Projecting inwardly and rearwardly are a plurality of beater sets 26, 28, previously described, which are fixed to axles 146, 148, respectively.

Two second sets of beaters 150, 152 are disposed to the rear of beaters 26, 28, respectively, and are fixedly attached to similar axles 154, 156, respectively. Axles 154, 156 are mounted on cross member 38 for pivoting about longitudinal axes 158, 160, respectively.

Lever arm 162 extends rearward of and is fixedly attached to axle 146. Another lever arm 164 extends forward of and is fixedly attached to axle 156. The distel ends of arms 162, 164 are connected by a bolted rod and sleeve assembly 166 very similar to the assembly consisting of rod 124, sleeve 128 and bolts 134, 136, discussed previously.

A similar mechanical interconnection exists between axle 154 and axle 148. This combination includes lever arms 168, 170, and interconnecting rod/sleeve assembly 172, as shown. This completes the structural description of harvester 10 for purposes of this invention.

OPERATION

Addressing now the operation of harvester 10 and redirecting attention initially to FIG. 2, it can be seen that as hydraulic motor 42 causes shaft 46 to rotate, shaft 54 is also caused to rotate in the same direction. As shaft 54 rotates, eccentric shaft 68 effectively revolves in a cone-shaped path the tip of which intersects the longitudinal axis of shaft 54. Because of the torque-restraining anti-rotational structure associated with radius arm 70c, member 70 does not spin around. Instead universal joints 76, 78 are caused to rotate in a generally backward and forward direction, although in reality there is additionally some upward and downward movement of these joints resulting in a net overall movement which looks like an elongate FIG. 8. It is because of this FIG. 8 motion that universal joints are used.

FIG. 2 shows the position of diameter arm 70b when foot 54b is disposed to the left. In this position joint 76 is as far to the rear as it will go in its motion and joint 78 is, correspondingly, at its forward-most position.

In half a rotation of shaft 54, foot 54b would be positioned on the right side of the longitudinal axis of shaft 54 with the effect that joint 76 will then have assumed its forward-most position and joint 78 its rearward most.

As joint 76, and therefore rod 122 and sleeve 126, moves in this undulating, reciprocating type of motion, arm 138, restricted to motion in a generally horizontal plane, travels in a reciprocating fashion through the arc identified as angle "A". Due to the rigid mechanical interconnection between and sizing of arm 138 and axle 146 and 156, beaters 26 and 152 are also caused to move through equal arcs "A".

In a parallel fashion, since joints 76, 78 are disposed at equal distances relative to shaft 68, joint 78 moves in a reciprocating fashion through a path equal to but opposite in phase as that of joint 76. Thus, as joint 76 travels in one direction, joint 78 travels in the opposite direction. It follow that beaters 28, 150 also reciprocate in arcs "A", as shown.

A vertical plane shown as dash-dot line 174 may be considered to represent the generally center vertical plane of a row of vines which pass through vine-receiving zone 22. Harvester 10 would be directed, in operation, down a row so that a center of vines passes coincident with plane 174. Observing relative movement of the four respective beaters from the positions shown in FIG. 2, as beater 26 moves inward toward plane 174, beater 28 is correspondingly moving away from the plane. Also, as beater 28 is moving outward, the other beater on the same side, here beater 152, moves inward. It will thus be apparent that forward left beater 28 and rearward right beater 150 each reach their inward most points concurrently. Correspondingly, right forward beater 26 and left rearward beater 152 reach their outermost points at that same point in time. The net result is that only one beater on each side strikes a vine row at a time and only one beater in a forward or rearward set strikes a row at a time. Yet it can be seen that all of the beaters in an opposite set swing mirror-image type arcs relative to vertical plane 174.

Figure 6:
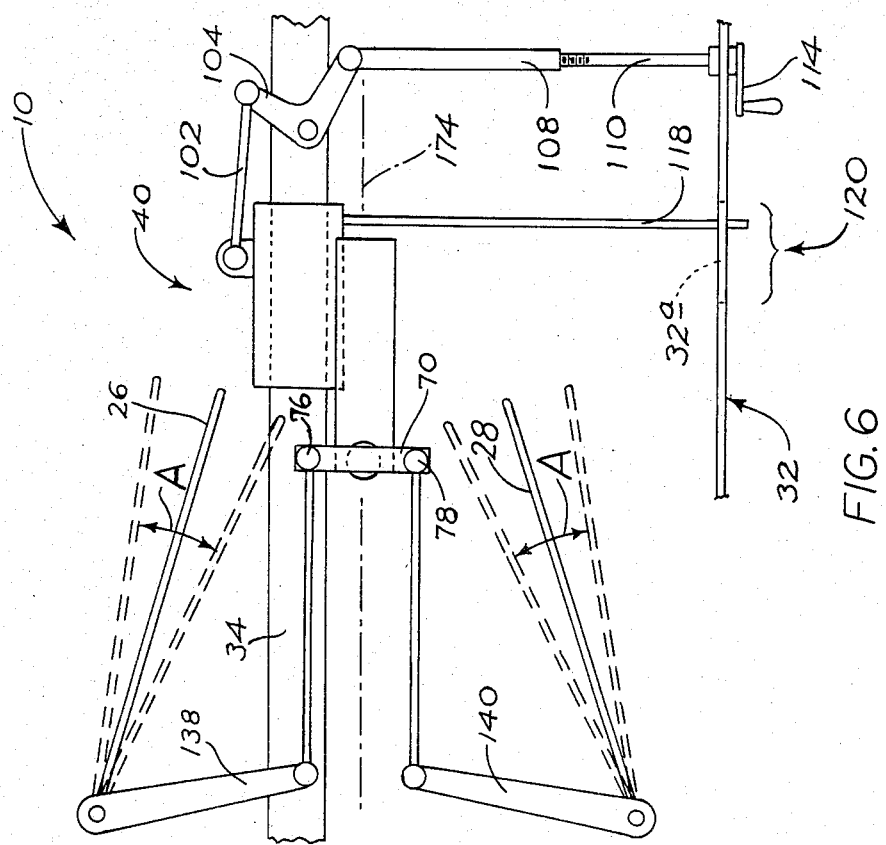
FIGS. 5 and 6 are simplified schematics, not to scale, of the apparatus of FIG. 2 illustrating two operating positions of the apparatus as contemplated by the present invention.
Figure 5:
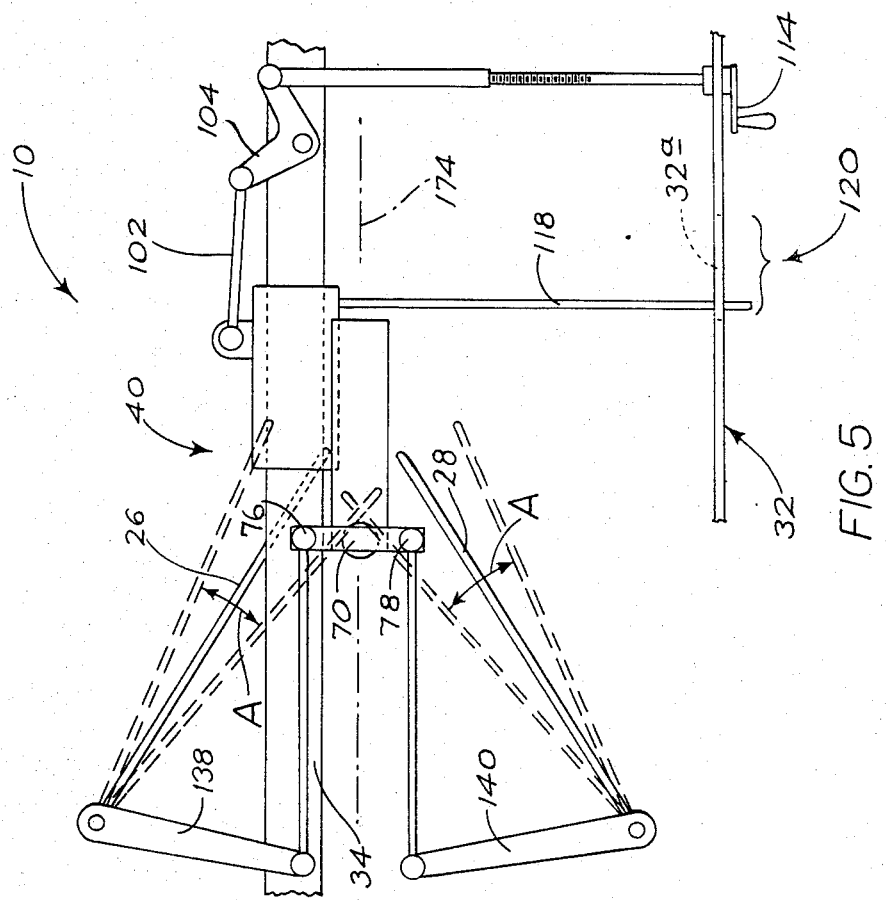

Addressing now FIGS. 5, 6 and describing the operation of harvester 10 as contemplated by the present invention, simplified schematics are shown which will serve to illustrate the practice of my invention. Driver 40 is shown in FIG. 5 in a relative forward position on beam 34. Indicator rod 118 extends through the forward portion of slit 32a indicating on scale 120 that beaters 26, 28 are in relatively close proximity. This position would be used typically on a row of rasberries which are very thin or, more typically, on a row of blackberries which require greater contact between the vines and beaters to free the fruit.

FIG. 6 shows driver 40 having moved rearward on beam 34 from its position shown in FIG. 5. This is accomplished by screwing rod 110 into sleeve 108, forcing L-arm 104 to rotate in a clockwise direction as viewed in the two figures. Driver 40 is thereby slid rearward on beam 34. By so moving driver 40, the inner ends of rocker arms 138, 140 are pulled rearward of harvester 10 relative to beam 34. Beaters 26, 28 are thereby separated from each other.

As discussed previously, although beaters 26, 28 operate in alternating fashion relative to plane 174, they pass through arcs during their reciprocating motion which are equally spaced from plane 174. It can therefore be said that by adjustment of driver 40 on beam 34 the arcs of beaters 26, 28 move in a mirror-image relationship relative to plane 174. The beater arcs are, under the construction shown in this preferred embodiment, always equi-distant relative to plane 174.

It can therefore been seen that even while harvester 10 is being operated, simply by turning crank 114 in an appropriate direction the arcs traveled by the respective beaters can be shifted in position relative to center plane 174 even while driver 40 is functioning. Thus, vine-row widths are easily accommodated without modifying harvesting speed. The substantially increased ease and convenience provided by my invention can increase significantly the quantity of fruit harvested. Such convenient row-width accommodation also makes it possible to move from a field growing one type of fruit, such as raspberries, into another field having a different type of fruit, such as blackberries, by simply adjusting the beater separation as the harvester is driven from one field into the next.

While the invention has been particularly shown and described with reference to the foregoing preferred embodiment, it will be understood by those skilled in the art that other changes in detail and format may be made therein without departing from the spirit and scope of the invention as defined in the following claims.

It is claimed and desired to secure as Letters Patent:
1. A harvesting apparatus transportable relative to the ground having a vine-receiving zone disposed about a generally vertical plane comprising
 a frame,
 at least one beater means pivotably mounted on said frame for swinging in the zone,
 reciprocating drive means mounted for selectable position adjustment on said frame, means drivingly connecting said drive means to said one beater means for reciprocatively swinging the latter in a known arc in such zone, and means for selectively adjusting the position of said drive means relative to said frame in a manner varying the angular position of said arc within said zone, said drive means providing reciprocating motion generally in a predetermined direction and said adjusting means including means operatively attached to said frame and to said drive means for adjusting the position of said drive means in the predetermined direction.

2. A harvesting apparatus transportable relative to the ground having a vine-receiving zone disposed about a generally vertical plane comprising a frame, at least one beater means pivotably mounted on said frame for swinging toward and away from said plane, reciprocating drive means slidably mounted on said frame for sliding along a known axis, means drivingly connecting said drive means with said one beater means for reciprocatively swinging the latter in a known arc, the drive means sliding axis being appropriately disposed to vary the angular position of the arc relative to said plane when said drive means is moved along said axis, and means for selectively adjusting the position of said drive means along said axis, said drive means providing reciprocating motion generally in a predetermined direction and including carriage means, and said adjusting means including means operatively attached to said frame and to said carriage means for adjusting the position of said drive means in the predetermined direction.

* * * * *